(12) United States Patent
Kunz

(10) Patent No.: US 6,976,227 B2
(45) Date of Patent: Dec. 13, 2005

(54) DYNAMIC INDICATION OF FIELD STATUS

(75) Inventor: James R. Kunz, Maine, NY (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 10/051,203

(22) Filed: Jan. 18, 2002

(65) Prior Publication Data
US 2003/0140117 A1    Jul. 24, 2003

(51) Int. Cl.$^7$ .................................................. G06F 7/00
(52) U.S. Cl. ....................... 715/825; 715/817; 709/218
(58) Field of Search ................................ 709/218, 203, 709/202; 715/514, 780, 783, 808, 810, 821, 715/843, 505, 506, 507, 508, 817, 825; 707/102; 345/619

(56) References Cited

U.S. PATENT DOCUMENTS

| | | | |
|---|---|---|---|
| 5,761,656 A | 6/1998 | Ben-Shachar | ................. 707/4 |
| 6,141,694 A | 10/2000 | Gardner | ..................... 709/240 |
| 6,243,722 B1 * | 6/2001 | Day et al. | ................... 715/512 |
| 6,353,851 B1 * | 3/2002 | Anupam et al. | ............ 709/204 |
| 2003/0023641 A1 * | 1/2003 | Gorman et al. | ............. 707/530 |

OTHER PUBLICATIONS

David Flanagan, "JavaScript: The Definitive Guide, 3rd Edition", Jun. 1998, 3rd Edition.*
*Internet and World Wide Web- How to Program*, Dietel et al., Prentice Hall, NJ, 2000 pp. 549-551.
"Give Your Users Form-Field Feedback, " Boris Feldman, Inquiry.com, http://gethelp.devx.com/techtips/js_pro/10min/10min0799/10min0799.asp, Dec. 5, 2001.

* cited by examiner

Primary Examiner—Rupal Dharia
Assistant Examiner—Brian J. Gillis
(74) Attorney, Agent, or Firm—John R. Pivnichny

(57) ABSTRACT

A browser displays a web page having a plurality of first input fields, on a display device at a client computer. The web page also has a second input field for use as a status indicator, positioned adjacent one of the first input fields. When a user enters data into one or more of the first input fields other than the one adjacent the second input field, a script is run to interpret the input data. In response to the interpretation, the second input field is altered to indicate a status for the adjacent first input field, without accessing a server.

15 Claims, 3 Drawing Sheets

DYNAMIC INDICATION OF FIELD STATUS

TECHNICAL FIELD

The invention relates generally to use of World Wide Web pages for data entry. More specifically the invention relates to a client method and apparatus for indicating the status of input fields on a web page based on the entries in other fields on the page.

BACKGROUND OF THE INVENTION

Remote data entry into server computer systems has been greatly expanded through use of networking techniques. In particular, use of the World Wide Web and its associated protocols has made it possible for almost anyone in the world with a client computer running browser software and an internet connection to enter data into a server computer system, provided the server allows such entry.

In one way of entering data, a server computer presents a web page to a client computer. On the web page are input fields where a user located at a display attached to the client computer may enter data. For example, in one type of input field the user may enter data using a keyboard to type in text. In another type of input field the user may select an item by first activating a pull-down list and then selecting a desired item on the list using a well known positioning device such as a mouse, trackball, or the like. Other input fields may operate by allowing the user to select a checkbox, radio button or other input field selection options.

In some applications, certain input fields may be optional and others required. Normally text or other indications in the web page would inform the user as to which are so required. Some applications may also perform an immediate check on the data entered in a field, and inform the user if an error is detected, so it may be immediately corrected.

For example, the browser displaying the page may send the data entered in a field to the server which performs the check. If an error is detected, the server sends a new page with the error indicated. The new page is essentially identical to the original page except the data already successfully entered in certain input fields is shown in those fields and a message describes the error detected in the current input field. The user corrects the error. The corrected entry is sent to the server, checked, and the user may proceed to enter data in other input fields or perform other tasks.

In another example, Boris Feldman describes in "Give Your Users Form-Field Feedback" published by Inquiry-.com, 2000 an immediate method of giving the user feedback when filling in HTML forms. A sample script of utility functions is provided. The web page developer adds indicator image placeholders onto a web page for each required field. Each image placeholder is associated with a field on the form. Then ONBLUR handlers are added to the HTML form elements to make sure that the indicators are updated when field values are changed. The general use of an ONBLUR statement is described in *Internet and World Wide Web-How to Program* by Deitel et al., Prentice Hall, N. J., 2000 pages 549–551. Finally a showWarn ( ) function is modified to do field validation appropriate to the field, such as code to make sure that a numeric field is truly numeric etc. Upon use, the user would see a corresponding warning indicator after entering incorrect data in any field for which a showWarn ( ) function was appropriately modified by the web page developer.

Gardner in U.S. Pat. No. 6,141,694 describes a method and apparatus for using a status field to indicate whether a more reliable source is available for an information field. For example, a computer network may include a plurality of servers and a plurality of clients. Information entered at a client has an associated level of certainty regarding its accuracy. When a user browses a site on the network having an information field with data contained therein, the method or apparatus determines from the associated status field whether a more reliable source exists. If so, then the information corresponding to the information field is retrieved from the more reliable source and the information currently contained in the information field is replaced with the retrieved information.

Based on the foregoing it is evident that new methods of assisting a user in the entry of data into input fields of web pages are highly desirable.

OBJECTS AND SUMMARY OF THE INVENTION

It is therefore a principal object of the present invention to enhance the data entry art by providing a method of dynamically indicating field status.

It is another object to provide a system wherein such enhanced operation is possible.

It is yet another object to provide program instruction means for performing such a method.

These and other objects are attained in accordance with one embodiment of the invention where there is provided a method of indicating input field status in a web page, comprising the steps of, running a browser at a client, displaying with the browser a plurality of first input fields in a web page, at the client, displaying with the browser a second input field for use as a status indicator, in the web page, the second input field positioned adjacent one of the first input fields, and running a script at the client to interpret an input from a first input field other than the one of the first input fields and in response thereto altering the second input field to indicate a status of the one of the first input fields.

In accordance with another embodiment of the invention there is provided a system for indicating input field status in a web page, comprising, a client processor adapted for running a browser, means for displaying with the browser a plurality of first input fields in a web page, at the client processor, means for displaying with the browser a second input field for use as a status indicator, in the web page, the second input field positioned adjacent one of the first input fields, and means for running a script at the client to interpret an input from a first input field other than the one of the first input fields and in response thereto altering the second input field to indicate a status of the one of the first input fields.

In accordance with yet another embodiment of the invention there is provided a computer program product for instructing a processor to indicate an input field status in a web page, the computer program product comprising, a computer readable medium, first program instruction means for running a browser at a client, second program instruction means for displaying with the browser a plurality of first input fields in a web page, at the client, third program instruction means for displaying with the browser a second input field for use as a status indicator, in the web page, the second input field positioned adjacent one of the first input fields, and fourth program instruction means for running a script at the client to interpret an input from a first input field other than the one of the first input fields and in response thereto altering the second input field to indicate a status of the one of the first input fields, and wherein all the program instruction means are recorded on the medium.

BEST MODE FOR CARRYING OUT THE INVENTION

For a better understanding of the present invention, together with other and further objects, advantages and capabilities thereof, reference is made to the following disclosure and the appended claims in connection with the above-described drawings.

Figure 1:
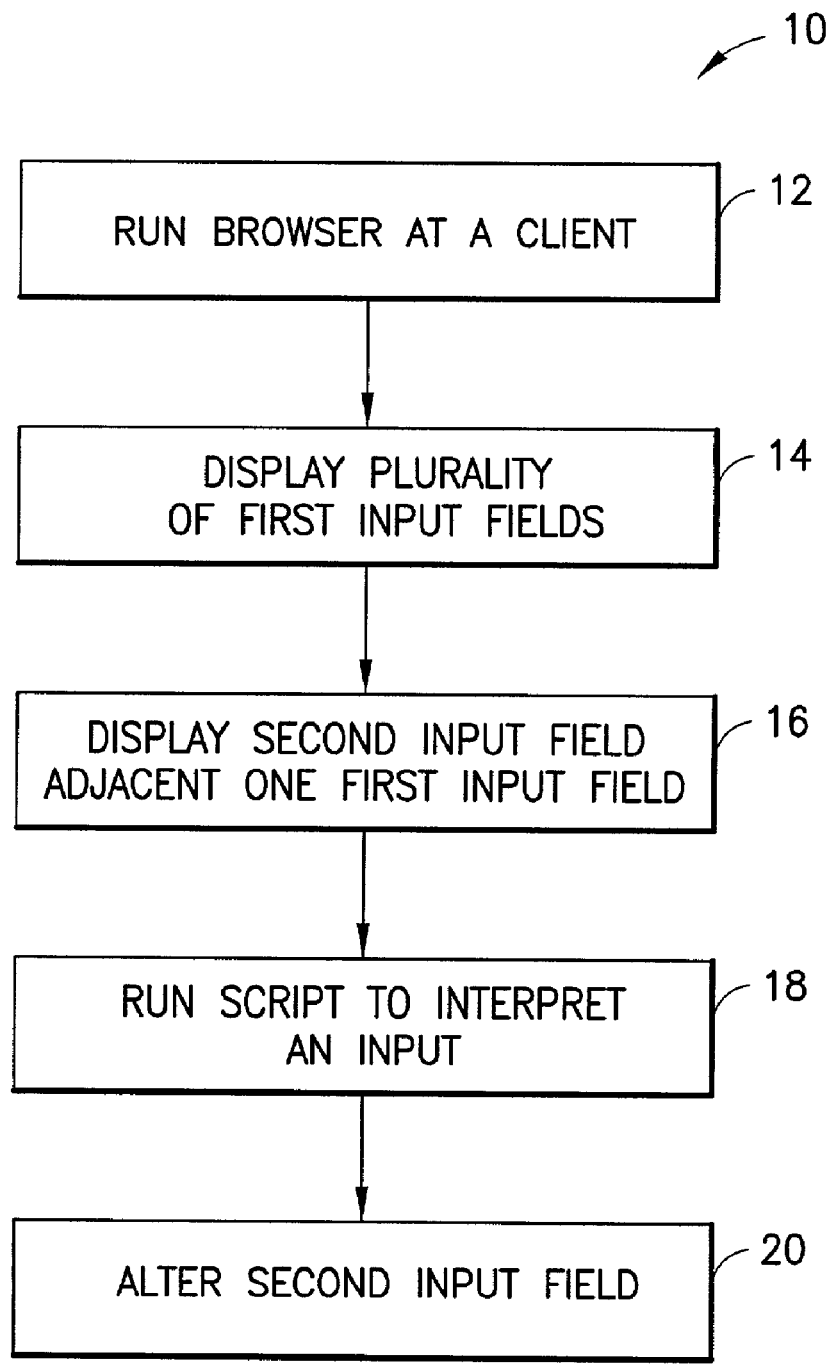
FIG. 1 is a flowchart illustrating steps which can be utilized to implement the method and system of the present invention.

In FIG. 1 there is shown a flowchart 10 of steps for implementing the present invention. In step 12 a browser is run on a client computer. The browser may be any type of World Wide Web page browser such as NETSCAPE NAVIGATOR or INTERNET EXPLORER® (INTERNET EXPLORER is a trademark of Microsoft, Inc. Redmond Wash.). The browser obtains a page over a network connection and presents the page on a display device attached to the client computer, where the page may be observed by a user. The particular page is identified by a network address such as a Uniform Resource Locator (URL). Any type of computing device capable of running a browser may serve as the client computer including but not limited to a desktop personal computer, laptop, palm device, portable computer, mainframe, or advanced cell phone.

In step 14 a page having a plurality of first input fields is displayed. First input fields may be any type or combination of input fields such as a text box, a pull-down list, checkbox, radio button, or any type of HTML input fields. First input fields would have been coded into the page by the page developer with the expectation that a user may wish to enter data into one or more of the fields. The page is displayed at least partially on a display device attached to the client computer. Any type of display device may be used such as a cathode ray tube (CRT) monitor, liquid crystal display (LCD), plasma display, and gas panel. If the page is larger than the display device, then only a portion of the page will be displayed at any time. The user may then navigate about the page with known techniques such as scroll bars, buttons, keyboard keys or the like.

In step 15 a second input field is displayed. The second input field is associated with one of the first input fields and is positioned adjacent this first input field. Adjacent shall be taken to mean in proximity to this first input field so that it is clear to the user which of the plurality of first input fields is the one associated with the second input field.

In step 18 a script is run at the client computer to interpret data entered into a first input field other than the one associated with the second input field. The script may be Java script, VISUAL BASIC® (VISUAL BASIC is a trademark of Microsoft, Inc.) or any other type of script accepted by the browser. The script is preferably run immediately after a user enters data. In response to this interpretation, the script alters the second input field. For example, the second input field may initially be set as an unselected radio button. The script may alter this unselected radio button into a selected radio button or vice versa. Likewise a checkbox may be altered from unchecked to checked. The text shown in a textbox may be altered.

Interpretation involves determining what was entered into the first input field other than the one associated with the second input field. Known determination procedures may be used such as logical or comparison tests or the like. Based on the results of such tests the second input field is then altered, not altered, or altered in a particular way dependent on the data entered.

Those skilled in the art will recognize that the script may be adapted to interpret a plurality of inputs from a plurality of first input fields other than the one associated with the second input field and in response thereto altering the second input field accordingly, without departing from the scope of the present invention. One skilled in the art may also provide a page having a plurality of second input fields each positioned adjacent a corresponding one of the first input fields. A script may be run to interpret an input from a first input field other than any of the corresponding input fields and in response thereto alter the plurality of second input fields, again without departing from the scope of the invention. Other combinations of first and second input fields are possible.

At no time does the user ever enter data into a second input field.

Figure 2:
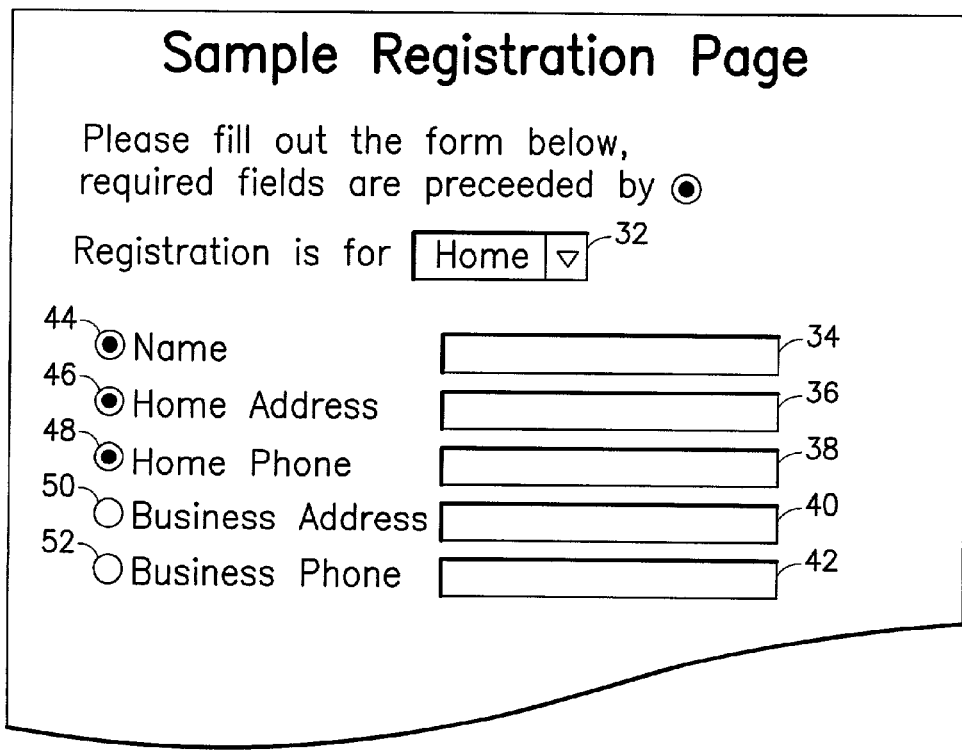
FIG. 2 illustrates a web page having input fields in accordance with the present invention.

In FIG. 2 there is shown an example page 30 having a plurality of first input fields 32, 34, 36, 38, 40 and 42. First input field 32 is a pull-down list and fields 34–42 are text boxes. Second input fields 44, 46, 48, 50, and 52 are radio buttons positioned adjacent first input fields 34–42 respectively. The example page 30 is displayed to the user by the browser on a display device. This example illustrates obtaining registration information from the user. The user enters data into input field 32 by selecting either "Home" or "Business". A script is then run to interpret this data. Based on the data, radio buttons 44–52 are altered accordingly to indicate the status of first input fields 34–42 respectively. As shown, if the user enters "Home" then radio buttons 44–48 are altered to display as selected, indicating to the user that corresponding first input fields 34–38 have a status of "required". Second input field radio buttons 50–52 are altered to display as unselected, indicating that corresponding first input field 40–42 respectively have a status of "not required" or "optional".

Figure 3:
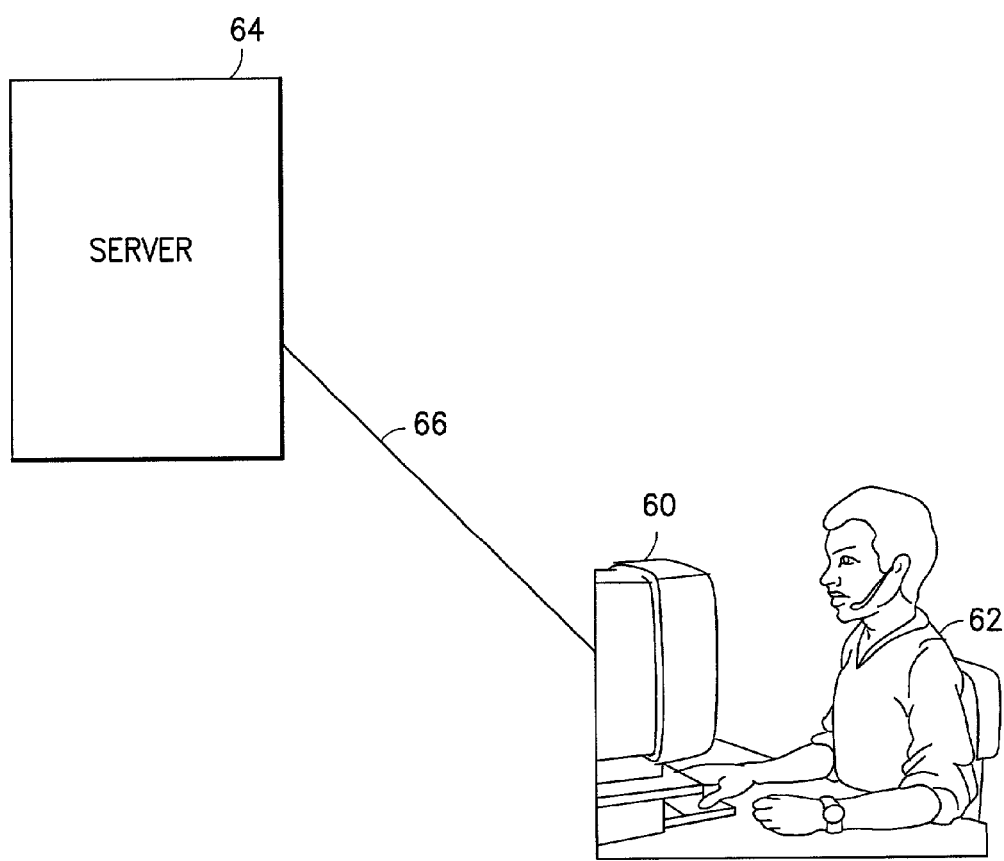
FIG. 3 illustrates a client server system for implementing the present invention.

In FIG. 3 there is shown a client computer having a display device attached 60. User 62 causes a browser to run on the client computer. The browser is attached to server 64 via attachment 66. Server 64 may be any type of computer capable of receiving a request for a page and serving up the page to the requesting browser. Attachment 66 may be any type of client-server attachment including a network connection, high speed line, telephone dial up via modem, direct cable connection, or any other attachment known in the art or combinations thereof. The browser displays the requested page on display device 60. The page has a plurality of first input fields. The page also has a second input field positioned adjacent one of the first input fields, for use as a status indicator. While code within the browser performs the displaying just stated, other means for displaying may be used. Examples of other such means include software code which is not part of the browser, hardware designed specially for the displaying step, a dedicated microprocessor, or a second computer. After user 62 enters data into a first input field other than the first input field adjacent the second input field, a script is run to interpret the data entered. In response to this interpretation the script alters the second input field to indicate a status of the first input field adjacent the second input field. This script may be run by the browser on client computer 60 without accessing server 64. However, the script may also run on another computer at the client by another application at the client without departing from the scope of the present invention.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method of indicating input field status in a web page, comprising the steps of: running a browser at a client; displaying with said browser a plurality of first input fields in a web page, at said client; displaying with said browser a second input field for use as a status indicator, in said web page, said second input field positioned adjacent one of said first input fields; running a script at said client to interpret an input from a first input field other than said one of said first input fields and in response thereto altering said second input field to indicate a status of said one of said first input fields; wherein said first input fields are HTML input fields; and wherein said second input field is an HTML input field.

2. The method of claim 1, wherein said client is attached to a server.

3. The method of claim 2, wherein said script is run without accessing said server.

4. The method of claim 1, wherein said second input field is a radio button.

5. The method of claim 1, wherein said script is run to interpret a plurality of inputs from a plurality of first input fields other than said one of said first input fields.

6. The method of claim 1, further comprising displaying with said browser a plurality of second input fields in said web page, each said second input field positioned adjacent a corresponding one of said first input fields and running said script at said client to interpret an input from a first input field other than any of said corresponding one of said first input fields and in response thereto altering said plurality of said second input fields.

7. The method of claim 1, wherein said script is a Java script.

8. A system for indicating input field status in a web page, comprising: a client processor adapted for running a browser; means for displaying with said browser a plurality of first input fields in a web page, at said client processor; means for displaying with said browser a second input field for use as a status indicator, in said web page, said second input field positioned adjacent one of said first input fields; means for running a script at said client to interpret an input from a first input field other than said one of said first input fields and in response thereto altering said second input field to indicate a status of said one of said first input fields; wherein said first input fields are HTML input fields; and wherein said second input field is an HTML input field.

9. The system of claim 8, wherein said client processor is attached to a server.

10. The system of claim 9, wherein said script is run on said client processor without accessing said server.

11. The system of claim 8, wherein said second input field is a radio button.

12. The system of claim 8, wherein said script is run to interpret a plurality of inputs from a plurality of first input fields other than said one of said first input fields.

13. The system of claim 8, further comprising means for displaying with said browser a plurality of second input fields in said web page, each said second input field positioned adjacent a corresponding one of said first input fields and means for running said script at said client to interpret an input from a first input field other than any of said corresponding one of said first input fields and in response thereto altering said plurality of said second input fields.

14. The system of claim 8, wherein said script is a Java script.

15. A computer program product for instructing a processor to indicate an input field status in a web page, said computer program product comprising:

a computer readable medium;

first program instruction means for running a browser at a client;

second program instruction means for displaying with said browser a plurality of first input fields in a web page, at said client;

third program instruction means for displaying with said browser a second input field for use as a status indicator, in said web page, said second input field positioned adjacent one of said first input fields; and fourth program instruction means for running a script at said client to interpret an input from a first input field other than said one of said first input fields and in response thereto altering said second input field to indicate a status of said one of said first input fields; and wherein all said program instruction means are recorded on said medium.

* * * * *